United States Patent
Kobayashi et al.

(10) Patent No.: US 6,750,979 B1
(45) Date of Patent: Jun. 15, 2004

(54) PRINTER-INCORPORATED ELECTRONIC STILL CAMERA

(75) Inventors: Shigeto Kobayashi, Saitama (JP); Seisuke Muroki, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 806 days.

(21) Appl. No.: 09/680,509

(22) Filed: Oct. 5, 2000

(30) Foreign Application Priority Data

Oct. 5, 1999 (JP) .......................................... 11-284067

(51) Int. Cl.⁷ ........................ H04N 5/225; G06F 15/00
(52) U.S. Cl. .................. 358/1.14; 358/1.15; 348/207.2; 348/375
(58) Field of Search ............................. 348/207.2, 375, 348/207.99, 373; 358/1.14, 1.15; 347/2

(56) References Cited

U.S. PATENT DOCUMENTS

| | | | | |
|---|---|---|---|---|
| 5,606,420 A | * | 2/1997 | Maeda et al. | 358/296 |
| 5,802,413 A | * | 9/1998 | Stephenson | 396/429 |
| 5,909,248 A | * | 6/1999 | Stephenson | 348/373 |
| 6,016,157 A | * | 1/2000 | Stephenson | 347/239 |
| 6,317,156 B1 | * | 11/2001 | Nagasaki et al. | 348/373 |
| 6,476,863 B1 | * | 11/2002 | Silverbrook | 348/231.9 |
| 6,507,361 B1 | * | 1/2003 | Barber | 348/207.2 |
| 6,515,761 B2 | * | 2/2003 | Aoto et al. | 358/1.6 |
| 6,560,410 B2 | * | 5/2003 | Ichikawa et al. | 396/2 |
| 6,628,333 B1 | * | 9/2003 | Gowda et al. | 348/333.11 |
| 6,655,776 B2 | * | 12/2003 | Murray | 347/19 |
| 6,665,008 B1 | * | 12/2003 | Silverbrook | 348/239 |

FOREIGN PATENT DOCUMENTS

| | | | |
|---|---|---|---|
| JP | 4-194832 | 7/1992 | ........... G03B/17/52 |
| JP | 2000321681 | * 11/2000 | |
| WO | 99/21055 | 4/1999 | ........... G03B/17/52 |

* cited by examiner

*Primary Examiner*—Edward Coles
*Assistant Examiner*—Chan S. Park
(74) *Attorney, Agent, or Firm*—Sughrue Mion, PLLC (57) ABSTRACT

A printer-incorporated electronic still camera has a pack loading chamber in which a film pack is loaded by opening a pack loading door. The film pack contains a predetermined number of self-developing type instant film sheets. A film pack detection switch is provided in the pack loading chamber, and is turned on upon being pressed by the loaded film pack. A film counter mechanism cooperating with a pair of spread rollers is provided for outputting a signal each time the instant film sheet is ejected through the spread rollers out of the camera. When the film pack detection switch is turned on, a system controller sets the predetermined number as an initial value, and counts down from the initial value each time it receives the signal from the film counter mechanism, to determine the remaining number of instant film sheets. If the user designates a greater number of hard copies to print than the remaining number of instant film sheets, an alarm is given to the user. Also when the pack loading door is opened while there remain some instant film sheets in the film pack, an alarm is given to the user.

13 Claims, 7 Drawing Sheets

PRINTER-INCORPORATED ELECTRONIC STILL CAMERA

BACKGROUND OF THE INVENTION

1. Field of the Invention

The present invention relates a printer-incorporated electronic still camera that may be loaded with a predetermined number of self-development type instant film sheets, so it may print an image on the instant film sheet on the basis of image data obtained through an imaging device of the camera.

2. Background Arts

Portable electronic still cameras are widely used that convert optical subject images into electric analog image signals through an imaging device, e.g. a CCD image sensor, and convert the image signals into digital image data to store it frame by frame as still images in a memory. The image data stored in the memory may be read out to display an appropriate one of the still images on a display device, such as an LCD panel incorporated in the camera body, a monitor CRT, a personal computer or another external device that may be connected to the electronic still camera.

Hard copies of the electronically photographed still images are made by use of video printers, including thermosensitive printers, thermal transfer printers, and ink-jet printers. To these video printers, printing sheets may be supplied as needed, so it is possible to select an appropriate number of copies to print regardless of the number of printing sheets that remain loaded in the printer.

Meanwhile, a printer-incorporated electronic still camera has been disclosed for example in JPA No. 11-127409, wherein an electronic still camera is incorporated with an optical printer that is small in size and does not need a large-capacity power source. The optical printer may print an image on a self-development type instant film sheet on the basis of image data obtained through the electronic still camera. Therefore a hard copy of a subject image photographed by the electronic still camera may be obtained instantly without the need for connecting a separate printer. The instant film sheet is usually provided as a film pack that contains a predetermined number of instant film sheets in a light tight fashion, so the printer-incorporated electronic still camera has a pack loading chamber for loading the film pack.

Since the number of instant film sheets contained in the film pack is not so large, about 10 pieces, and it is necessary to load a new film pack for the sake of supplying the instant film sheets to the printer-incorporated electronic still camera, the number of copies that may be printed in continuous succession is limited to the number of instant film sheets remaining in the loaded film pack. Although the remaining number of instant film sheets may be counted and shown to the operator by some means, it is possible that the operator fails to check the remaining number, and designates a larger number of copies to print than the remaining number of instant film sheets. In that case, the operator cannot obtain the desired number of copies.

On the other hand, after the film pack is loaded in the pack loading chamber, an exposure opening of the film pack is uncovered, allowing a printing head of the optical printer to project printing light onto a photosensitive surface of the instant film sheet. The exposed instant film sheet is ejected one by one to outside through a pair of spread rollers that spread processing fluid over the exposed instant film sheet, in the same way as in conventional instant cameras. Therefore, if the loaded film pack is exposed to ambient light, the photosensitive surface of the following one of the instant film sheets get fogged. Therefore, it is necessary to shield the film pack from ambient light until all of the contained instant film sheets get printed and ejected. However, if a pack loading door of the pack loading chamber is mistakenly opened, the loaded film pack will be exposed to ambient light.

SUMMARY OF THE INVENTION

An object of the present invention is to provide a printer-incorporated electronic still camera that is effective to avoid designing the number of copies to be larger than the remaining number of instant film sheets.

Another object of the present invention is to provide a printer-incorporated electronic still camera that is effective to avoid fogging the instant film sheets of the loaded film pack.

According to the present invention, a printer-incorporated electronic still camera comprising:

an imaging device for obtaining image signals from subjects, and storing digital image data obtained from the image signal as still images in a memory;

a chamber for loading a stack of recording sheets;

a printing device for printing still images successively on the recording sheets on the basis of the image data read out from the memory;

a print number input device for entering the print number of hard copies of a still image;

a counting device for counting the number of recording sheets remaining unused in the chamber;

a comparing device for comparing the entered print number with the remaining number of recording sheets; and an alarming device for alarming when the entered print number is greater than the remaining number of recording sheets.

It is preferable to provide the printer-incorporated electronic still camera with a device for stopping the printing device from printing when the entered print number is greater than the remaining number of the recording sheets, in addition to or instead of the alarming device.

According to a preferred embodiment, the entered print number is canceled when the entered print number is greater than the remaining number of the recording sheets.

According to another aspect of the present invention, a printer-incorporated electronic still camera comprising:

an imaging device for obtaining image signals from subjects, and storing digital image data of the subjects obtained from the image signal as still images in a memory;

a chamber for loading a stack of photosensitive recording sheets;

a door member for closing the chamber in a light-tight fashion;

a printing device for printing still images successively on photosensitive recording sheets on the basis of the image data read out from the memory;

a counting device for counting the number of photosensitive recording sheets remaining unused in the chamber;

a device for detecting that the door member is opened; and an alarming device for alarming when the door member is opened while there are any unused photosensitive recording sheets in the chamber.

It is also preferable to provide the printer-incorporated electronic still camera with a locking device for locking the door member in its closed position so long as there are any unused photosensitive recording sheets in the chamber instead of the alarming device.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
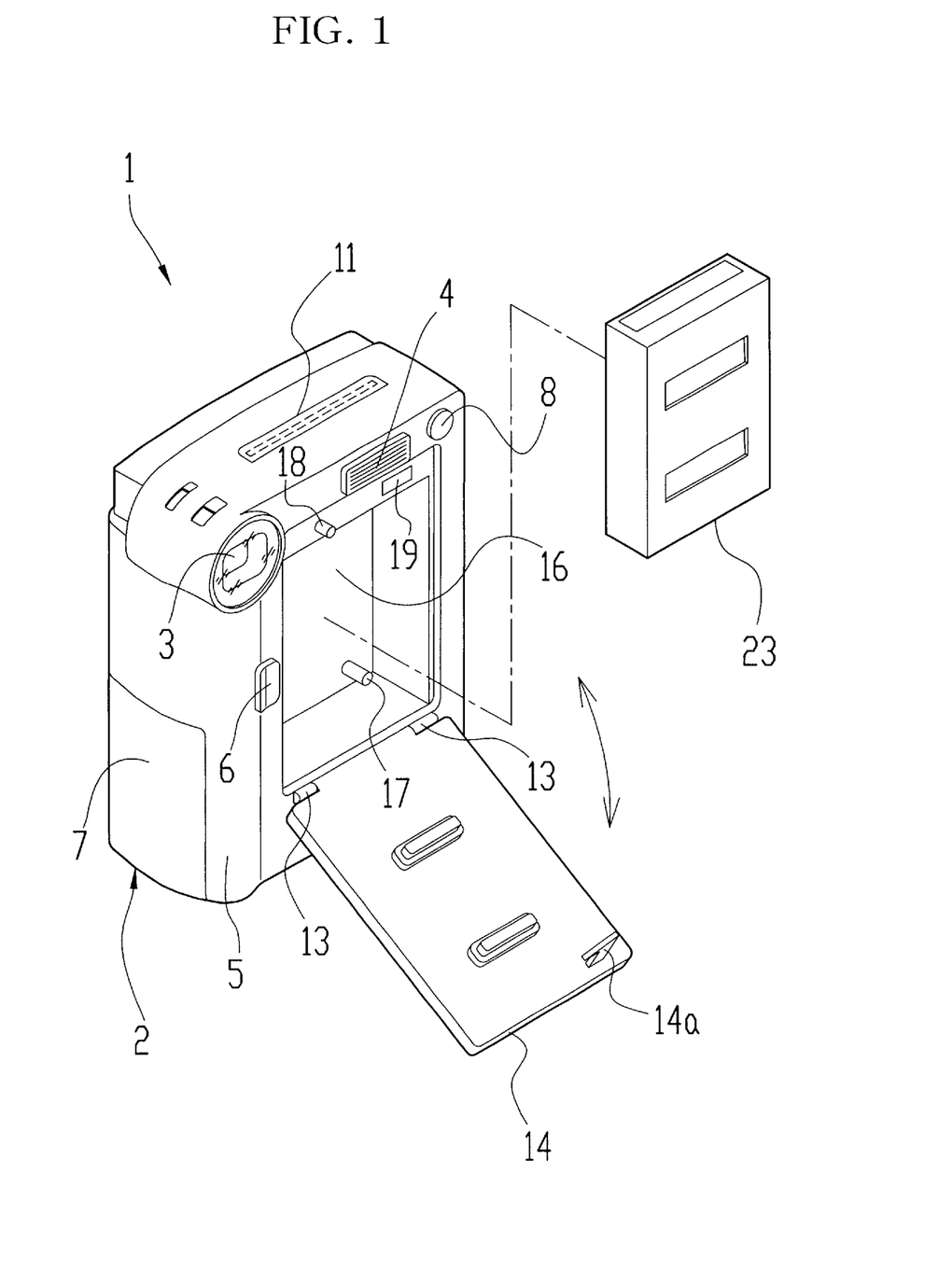
FIG. 1 is a front perspective view of a printer-incorporated electronic still camera with its pack loading door open, according to an embodiment of the invention.
Figure 2:
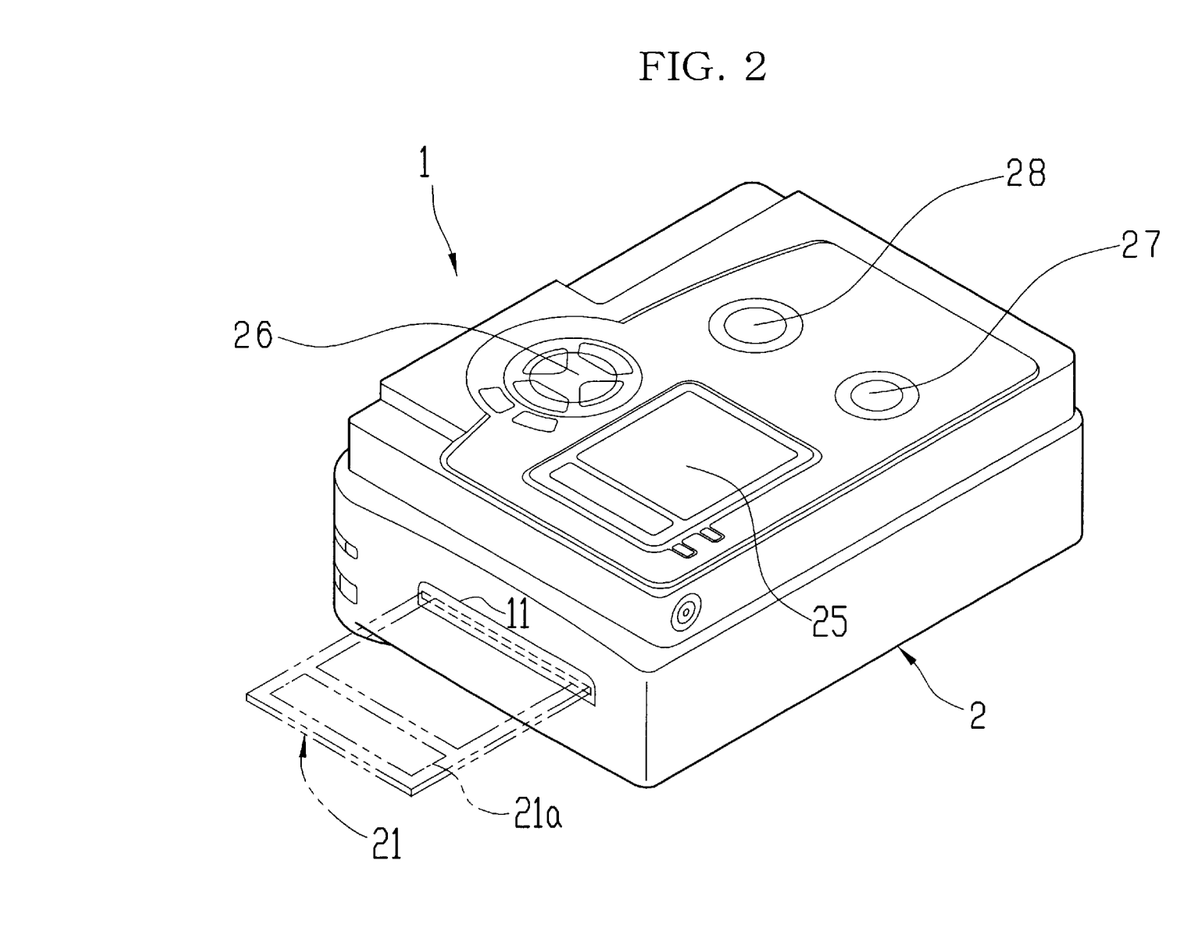
FIG. 2 is a rear perspective view of the printer-incorporated electronic still camera of FIG. 1, in a laid-down posture.

In FIGS. 1 and 2, a printer-incorporated electronic still camera 1, hereinafter called simply a printer-incorporated camera 1, has a camera lens 3, a flash projector 4 and an unlocking button 8 on a front side of a camera body 2. A battery chamber lid 7 is formed on one side of a grip portion 5, so power source batteries may be loaded inside the grip portion 5. A shutter button 6 is located on a front portion of the grip portion 5.

A film ejection slot 11 is formed through a top face of the camera body 2, through which an exposed instant film sheet 21 is ejected. A pack loading door 14 is mounted to a center position of the camera body 2 through hinges 13. The pack loading door 14 is urged toward an open position shown in FIG. 1 by springs that are not-shown but mounted inside the hinges 13. By opening the pack loading door 14, a film pack 23 may be loaded in a pack loading chamber 16. The film pack 23 contains a predetermined number of, e.g. 10 sheets of, instant film sheets 21 in a stack A film pack detection switch 17 is provided in the pack loading chamber 16. The film pack detection switch 17 is turned on when it is pressed by the film pack 23 as loaded in the pack loading chamber 16. The film pack detection switch 17 is turned off when the film pack 23 is unloaded. A door position detector switch 18 and a door lock mechanism 19 are provided above the pack loading chamber 16. The door position detector switch 18 is turned on when it is pressed by the pack loading door 14 in its closed position, and is turned off when the pack loading door 14 is opened. The door lock mechanism 19 locks the pack loading door 14 in the closed position by engaging with a claw 14a that is formed on a rear side of the pack loading door 14. By pressing the unlocking button 8, the door lock mechanism 19 unlocks the pack loading door 14, then the pack loading door 14 moves to the open position according to the urging force of the springs incorporated into the hinges 13.

On the back side of the camera body 2, an LCD panel 25, a multi-operation button 26, a print start key 27, and a power switch 28 are provided. The LCD panel 25 constitutes a so-called electronic viewfinder that displays subject images in a photographic field of the camera lens 3 in real time fashion.

The multi-operation button 26 is used primary for zooming of a digital zoom system. The multi-operation button 26 is also used for many kinds of operations in different modes, and for selection of an image frame on reproduction and printing. When the print start key 27 is pressed, an image displayed on the LCD panel 25 starts being printed.

Figure 3:
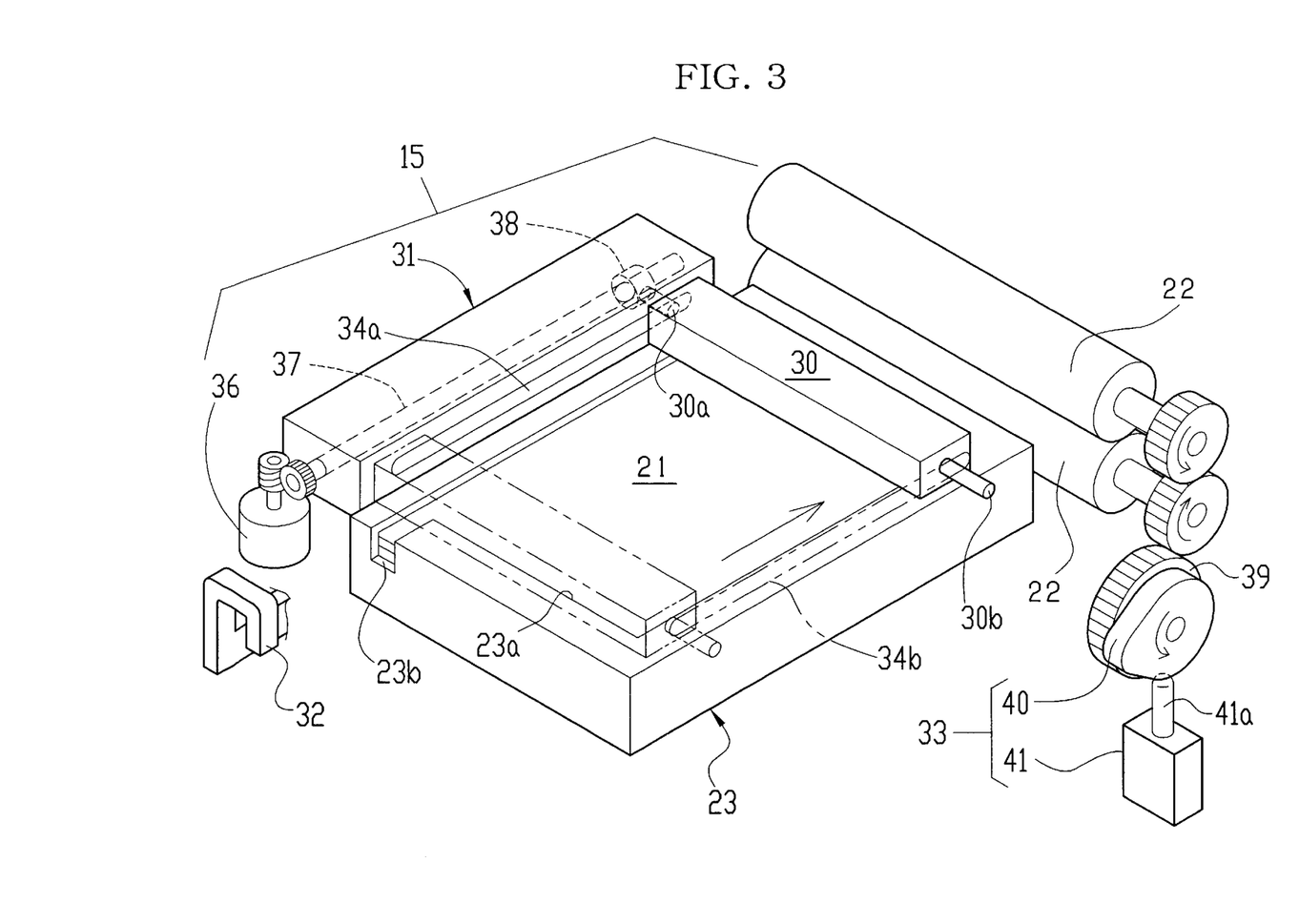
FIG. 3 is a perspective view of an optical printer section of the printer-incorporated electronic still camera of FIG. 1.

An optical printer section 15 of the printer-incorporated camera 1 is located on the back side of the pack loading chamber 16. As shown in FIG. 3, the optical printer section 15 is constituted of a pair of spread rollers 22 that are disposed behind the film eject ion slot 11, a printing head 30, a head scanning mechanism 31, an advancing claw mechanism 32 and a film counter mechanism 33 that outputs a detection signal each time the instant film sheet 21 is ejected out of the camera body 2. The printing head 30 extends in a main scan direction, that is perpendicular to a film advancing direction from the film pack 23 to the spread rollers 22, shown by an arrow in FIG. 3.

The instant film sheet 21 is a well-known mono-sheet type. The mono-sheet type instant film sheet 21 is mainly constituted of a photosensitive layer, an image receiving layer, and a processing fluid pod 21a. The photosensitive side of an uppermost one of the instant film sheets 21 stacked in the film pack 23 is exposed through an exposure opening 23a. The printing head 30 is directed to projecting printing light beams onto the uppermost instant film sheet 21 across the width of the exposure opening 23a, as it is moved by the head scanning mechanism 31 over a length of the exposure opening 23a, i.e. in a sub scan direction that is parallel to the film advancing direction.

The head scanning mechanism 31 includes a lead screw 37 that extends in the sub scan direction, a scanning motor 36 for rotating the lead screw 37, and a shift member 38 that is moved in an axial direction of the lead screw 37, i.e. in the sub scan direction, upon the lead screw 37 being rotated. To the shift member 38 is secured one axle 30a of the printing head 30. The axle 30a protrudes in the main scan direction from one side of the printing head 30, and is inserted in a slot 34a that is elongated along the sub scan direction. Another axle 30b protrudes in the main scan direction from the opposite side of the printing head 30, and is inserted in a slot 34b that is elongated along the sub scan direction. Thus, the printing head moves with the shift member 38 along the sub scan direction when the lead screw 37 is rotated by the scanning motor 36. The scanning motor 36 is a stepping motor that may rotate in forward and rearward directions. When the scanning motor 36 rotates forward, the printing head 30 moves from a print start position shown by solid lines to a print end position shown by phantom lines.

The advancing claw mechanism 32 is activated when an image is completely printed by the printing head 30, to enter the film pack 23 through a notch 23b and push a trailing edge of the exposed instant film sheet 21 out of the film pack 23. Then, a leading end of the exposed instant film sheet 21 is inserted into between the spread rollers 22, so the exposed instant film sheet 21 is fed by the spread rollers 22 out of the camera body 2 through the film ejection slot 11. While the instant film sheet 21 is being squeezed through the spread rollers 22, the pod 21a is ruptured and the processing fluid is spread between the photosensitive layer and the image receiving layer. Thereby, a latent image formed on the photosensitive layer is transferred to the image receiving layer and developed into a positive image in a few minutes after the ejection.

The spread rollers 22 and the advancing claw mechanism 32 constitute a film ejection mechanism, and may be configured in the same way as that used in a conventional instant camera.

The film counter mechanism 33 is constituted of an interconnection cam 40 that cooperates with the spread rollers 22 through gears 39, and a micro switch 41. Gear ratios of the gears 39 are determined such that the interconnection cam 40 makes one revolution each time one instant film sheet 21 is ejected through the spread rollers 22. At each revolution of the interconnection cam 40, a projection 41a of the micro switch 41 is pressed by the interconnection cam 40, turning on the micro switch 41.

Figure 4:
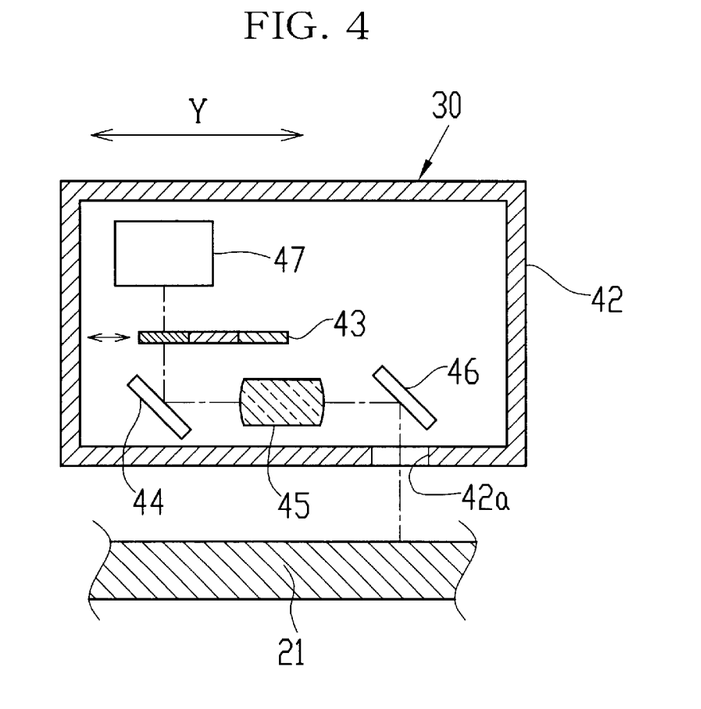
FIG. 4 is a schematic sectional view of a printing head of the optical printer section.

FIG. 4 shows an example of the printing head 30. In a light-tight housing 42 is mounted a fluorescent display tube 47 that is elongated in the lengthwise direction of the printing head 30, i.e. the main scan direction. Illuminating light from the fluorescent display tube 47 includes light components of red, green and blue. Instead of the fluorescent display tube 47, another kind of light source may be used insofar as it emits light including those three primary color components.

A color filter 43 is placed in a path of the illuminating light. The color filter 43 consists of a red pass filter portion, a green pass filter portion and a blue pass filter portion, which extend along the fluorescent display tube 47 and are arranged side by side in a perpendicular direction Y to the fluorescent display tube 47. Since the printing head 30 and thus the fluorescent display tube 47 extend in the main scan direction, the direction Y, corresponds to the sub scan direction. By shifting the color filter 43 in the direction Y in response to a filter switching signal, those filter portions are positioned one by one in the illuminating light path.

Thus, one of the three color components of the illuminating light from the fluorescent display tube 47 that passes through the color filter 43, is directed to an opening 42a of the housing 42 through a mirror 44, a micro lens array 45 and a mirror 46, and then projected as printing light of one color onto the instant film sheet 21. The micro lens array 45 consists of an array of micro cylindrical lenses, called SELFOC lens (a trade name), that prevents the printing light after passing through the individual liquid crystal segment from diverging to other pixel areas. Therefore, the number of micro cylindrical lenses of the micro lens array 45 is equal to the number of pixels in one main scanning line.

Figure 5:
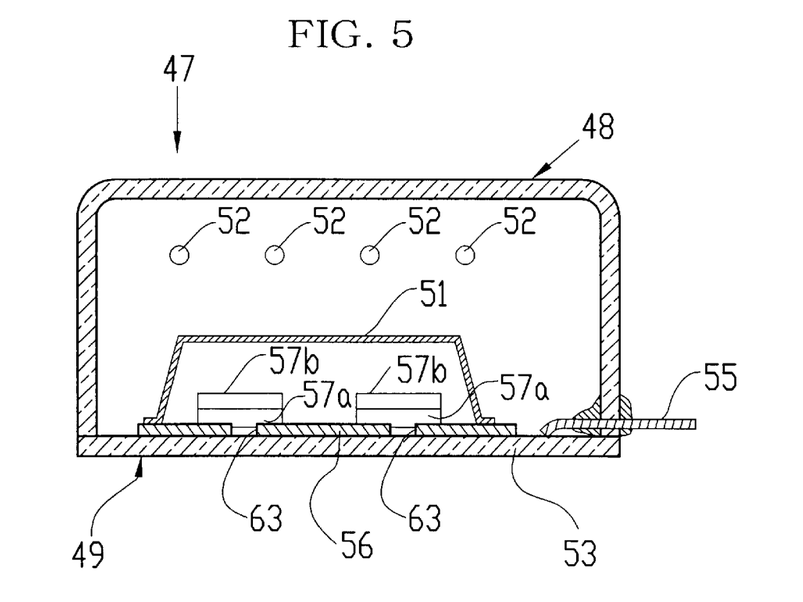
FIG. 5 is a schematic sectional view of a fluorescent display tube of the printing head of FIG. 4.
Figure 6:
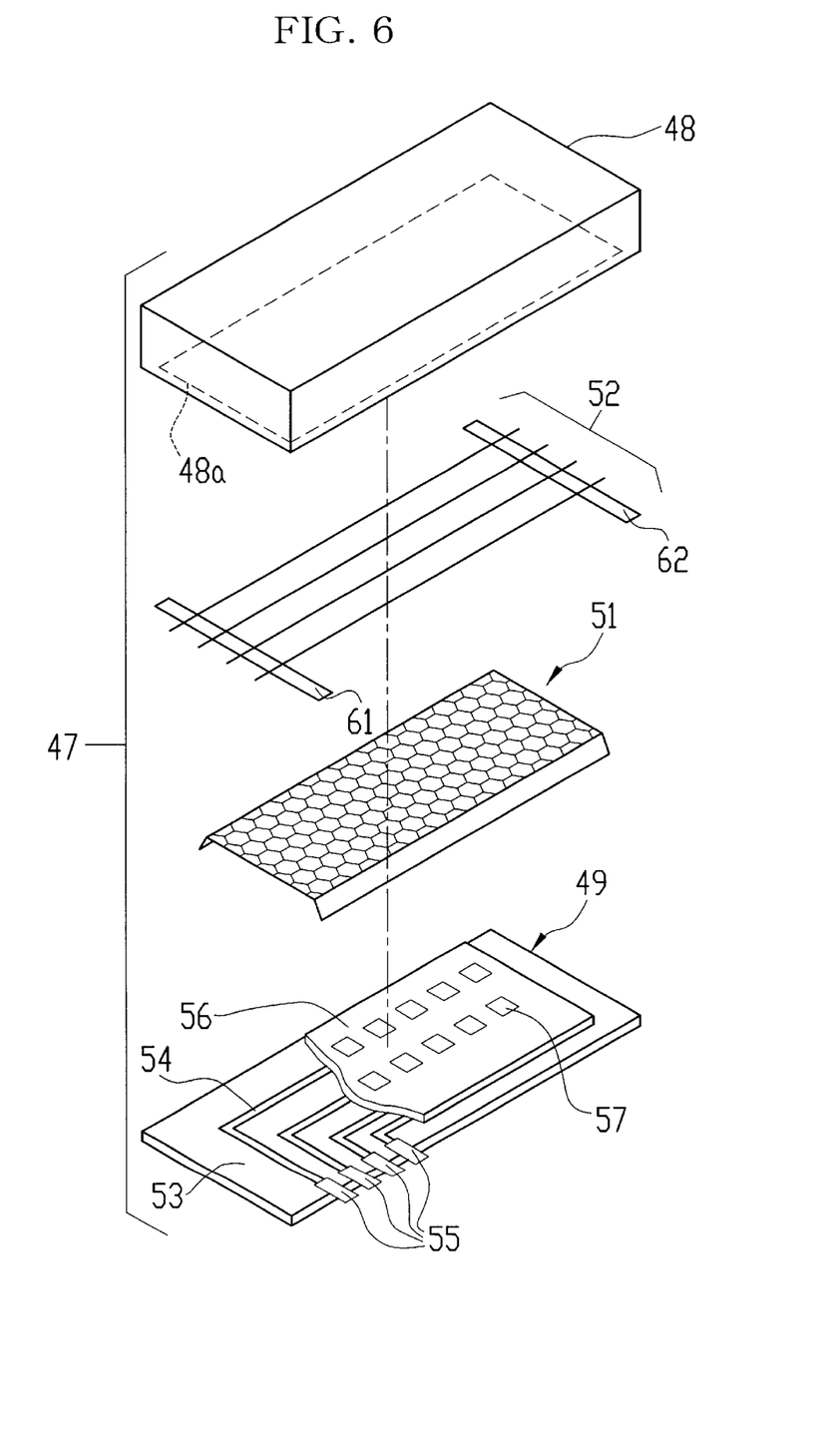
FIG. 6 is an exploded perspective view of the fluorescent display tube of FIG. 5.

As shown in FIGS. 5 and 6, the fluorescent display tube 47 has a glass casing 48 with an open bottom 48a that is closed by a glass substrate 49. In a vacuumed interior of the glass casing 48 are placed a mesh 51 and a filament 52. The glass substrate 49 is constituted of circuit patterns 54 formed on a transparent glass plate 53, an isolating layer 56 covering the circuit patterns. 54, and square anodes 57 formed on the obverse of the isolating layer 56. The anodes 57 are made of conductors 57a coated with fluorescent material 57b, wherein the conductors 57a may be made from graphite by etching or the like. The anodes 57 are electrically connected to the circuit patterns 54 through holes 63 that are formed through the isolating layer 56. The circuit patterns 54 are connected to lead contacts 55 that are protruded out through the glass casing 48. The circuit patterns 54 are made very narrow so that they will not hinder the display of the fluorescent display tube 47.

Also the filament 52 is constituted of very fine tungsten core wires coated with an oxide such as barium, for not hindering the display. The filament 52 radiates electrons when a voltage is applied across opposite lead contacts 61 and 62. The lead contacts 61 and 62 are protruded outside through the glass casing 48. For the same reason, the mesh 51 is formed by photo-etching a metal foil, such as a stainless steal foil. By applying a positive voltage to the mesh 51, the electrons from the filament 52 are directed to the anodes 57. By applying a negative voltage to the mesh 51, the electrons are blocked from the anodes 57.

When the positive voltage is applied from the circuit patters 54 to the conductors 57a, the anodes 57 attracts the electrons that are directed to the anodes 57 through the mesh 51. As a result, the fluorescent material 57b is excited to emit light. The lead contacts 55, 61 and 62 and the mesh 51 are connected to a head driver 89 (see FIG. 8). When the head driver 89 applies the voltage to the three electrodes, i.e. the filament 52, the mesh 51 and the anodes 57, the fluorescent material 57b on each anode 57 emits light. The light from the fluorescent material 57b travels through the glass plate 53, and is projected toward the color filter 43. Then, the light is directed through the mirror 44, the micro lens array 45 and the mirror 46 to the instant film 21.

Figure 7:
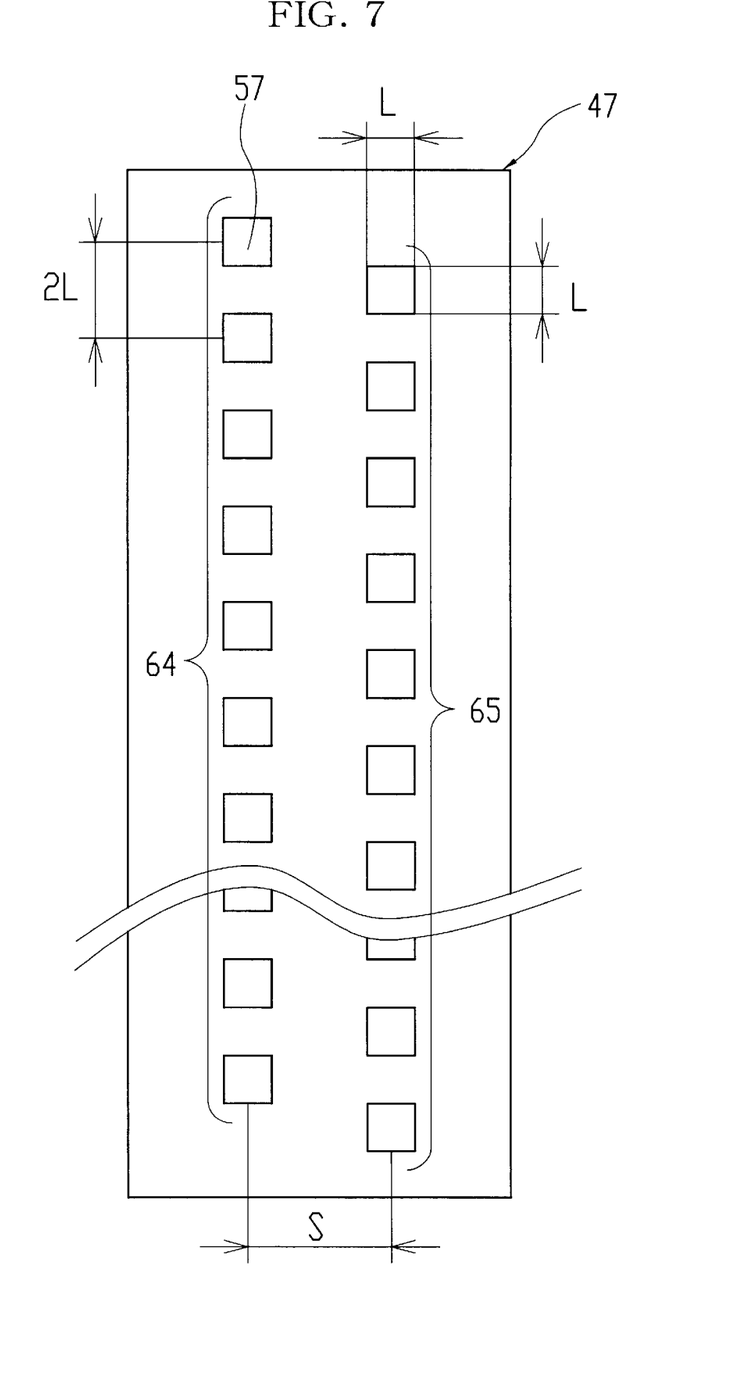
FIG. 7 is a bottom side view of the fluorescent display tube of FIG. 5.

FIG. 7 shows the bottom side of the fluorescent display tube 47, though the circuit patterns 54 are not shown for clarity sake. Each anode 57 has a size that corresponds to one pixel on printing. The anodes 57 are arranged in two rows 64 and 65 along the length of the fluorescent display tube 47, such that the anodes are arranged at constant intervals in each row. Provided that one side of each anode 57 has a length "L", the interval between the anodes 57 is "2L (=2×L)". The anodes 57 of the first row 64 are staggered from those of the second row 65, such that the anodes 57 of the first row 64 are placed in correspondence with spaces between the anodes 57 of the second row 65, so that any space would not remain if these anodes 57 are arranged in arrow.

Each of the first and second rows 64 and 65 is constituted of 240 anodes 57. At the exposure, the anodes 57 of the first row 64 are activated to emit light beams and, thereafter, the printing head 30 is moved in the sub scan direction by a pitch that corresponds to an interval "S" between the first row 64 and the second row 65 in the sub scan direction. Then the anodes 57 of the second row 65 are activated to emit light beams. As a result, a main scanning line consisting of 480 pixels is recorded on the instant film sheet 21. The amount of light emitted from the individual anodes 57 is controlled in accordance with densities of their corresponding pixels. In this way, 640 lines are printed on the instant film sheet 21 as the printing head 30 moves in the sub scan direction. Consequently, an image printed on the instant film sheet 21 consists of 480×640 pixels.

Figure 8:
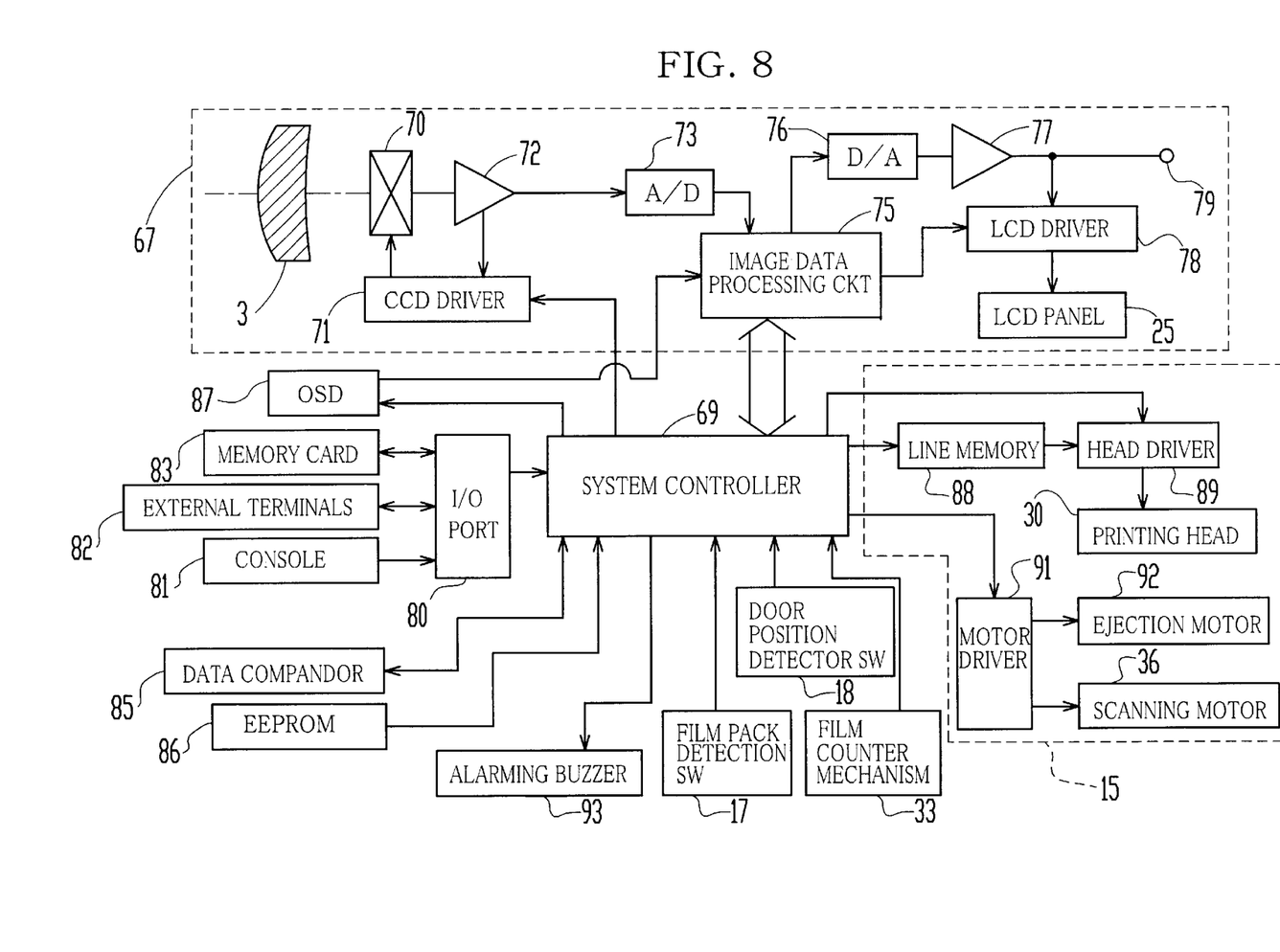
FIG. 8 is a block diagram illustrating the circuitry of the printer-incorporated electronic still camera of FIG. 1.

FIG. 8 shows the circuitry of the printer-incorporated camera 1 of the present embodiment, wherein all electric components of the camera 1, including a camera section 67 and the printer section 15, are controlled by a system controller 69.

A main component of the camera section 67 is a CCD image sensor 70 that is located behind the camera lens 3. By focusing the camera lens 3, an optical image of a subject is formed on a photoelectric conversion surface of the CCD image sensor 70. Micro color filters for red, green and blue are arranged in a matrix on the photoelectric conversion surface, so an image signal representative of the optical image is color-sequentially output from the image sensor 70 as the image sensor 70 is driven by a CCD driver 71. The image signal is amplified to an appropriate level through an amplifier 72, and then converted into digital image data through an A/D converter 73. As well known in the art, the A/D converter 73 samples the image signal in synchronization with the driving timing of the CCD image sensor 70.

The digital image data is sequentially sent to an image data processing circuit 75 for white balance correction, gamma correction, and other processing of the digital image data. The image data processing circuit 75 also produces NTSC composite picture signal from the processed image data, and sends it to an output terminal 79 through a D/A converter 76 and an amplifier 77. By connecting a home TV to the output terminal 79, the home TV can display a series of subject images photographed through the CCD image sensor 70. The picture signal from the amplifier 77 is applied to an LCD driver 78 that drives the LCD panel 25, so the LCD panel 25 displays the moving images of the subject.

The system controller 69 monitors through an I/O port 80 input signals from a console 81, including the multi-operation member 26 and the print start key 27, or from external terminals 82, and executes operation programs in accordance with the input signals.

The memory card 83 may also be connected to the system controller 69 through the I/O port 80. The memory card 83 stores the image data obtained from the image data processing circuit 75, frame by frame in a compressed fashion. For instance, the memory card 83 is capable of storing the image data up to 50 frames. The memory card 83 may previously store compressed image data of a variety of, e.g. 50 types of, decorative frames that are used for modifying contours of the frames or decorative patterns surrounding individual subject images.

A data compandor 85 consists of a data compressing section for compressing image data from the image data processing circuit 75 and writing it on the memory card 83, and a data expanding section for reading compressed image data from the memory card 83 and expanding it. The data companding circuit 85 is controlled by the system controller 95.

EEPROM 86 previously stores various kinds of adjustment data which are referred to by the system controller 69 when the electronic still camera is operated according to a predetermined sequence. The adjustment data are adjusted to each individual electronic still camera in an inspection process after the assembly of the cameras is fished. The adjustment data includes data concerning focusing of the camera lens 3, correction data for use in printing the respective colors and so forth.

An on-screen display IC (OSD) 87 is provided for making it possible to do various set-up operations on the console 81 while observing set-up values on the LCD panel 25.

The printer section 15 includes a line memory 88, a head driver 89, a motor driver 91, and the ejection motor 92, in addition to the printing head 30 and the scanning motor 36. In printing, image data of one color of a full-color image frame to record is read out line by line from the memory card 83, and the image data of one line is successively written in the line memory 88. The head driver 89 drives the printing head 30 in accordance with the image data of one line under the control of the system controller 69. In this embodiment, the head driver 89 controls the light emission from the individual anodes 57 of the fluorescent display tube 47 so as to control the intensity of the printing light in accordance with the image data.

The system controller 69 also detects the remaining number of instant film sheets 21 with reference to signals from the film pack detection switch 17 and the film counter mechanism 33. Specifically, the system controller 69 sets the predetermined number, i.e. 10 in this instance, as an initial count value immediately after the film pack detection switch 17 is turned on by the film pack 23 as it is loaded into the pack loading chamber 16. Thereafter, each time the instant film sheet 21 is ejected, the micro switch 41 of the film counter mechanism 33 is turned on to output the detection signal to the system controller 69, so the system controller 69 counts down from the initial value, to determine the remaining number of instant film sheets 21.

An alarming buzzer 93 is provided for alarming that the designated number of hard copies to print is more than the remaining number of instant film sheets 21.

Now, the operation of the printer-incorporated camera 1 will be described. The power switch 28 is turned on to start supplying the camera 1. Then, the present mode is set either to an imaging mode or to a reproduction mode by operating the multi-operation member 26.

In the imaging mode, the CCD image sensor 70 continuously photographs subject images, and the images are displayed as moving images on the LCD panel 25 that functions as an electronic viewfinder. Upon making a release-operation on the shutter button 6, image data of a subject image displayed at that moment on the LCD panel 25 is written as a still image on the memory card 83. The memory card 83 is capable of storing image data of one frame upon each-operation on the shutter button 6. It is also possible to delete image data of appropriate image frames and write image data of new image frames instead. When an external memory medium is connected to one of the external terminals 82, image data of appropriate image frames may be transferred from the memory card 83 to the external memory medium, or may be written directly on the external memory medium.

In the reproduction mode, an appropriate subject image is selected from among those stored in the memory card 83 by operating the multi-operation button 26. Then image data of the selected image is supplied to the LCD driver 69 through the image data processing circuit 75, the D/A converter 76 and the amplifier 77, so a subject image is displayed on the LCD panel 25.

Thereafter, if it is selected to synthesize the decorative frame by operating the multi-operation button 26, the decorative image data is read out from the memory card 83 and is expanded through the data expanding section of the data compandor 85. Thereafter, the decorative image data read out from the memory card 83 and the image data of the selected subject image are transferred to the image data processing circuit 75. Then, a composite image composed from the subject image and the decorative frame is displayed on the LCD panel 25.

To switch to a printing mode, first the number of hard copies to print is entered through the multi-operation member 26. When the printer-incorporated camera 1 is switched from the imaging mode to the printing mode, an image photographed at the latest is displayed on the LCD panel 25. On the other hand, when it is switched from the reproduction mode to the printing mode, an image read out from the memory card 83 is displayed on the LCD panel 25. Upon receipt of the entered print number from the console 81, the system controller 69 compares it with the remaining number of instant film sheets 21. If the entered print number is greater than the remaining number, the system controller 69 activates the alarming buzzer 93. In this condition, the system controller 69 would not activate the printer section 15 even if the print start key 27 is pressed.

After changing the print number to be equal to or less than the remaining number of instant film sheets 21, the operator presses the print start key 27 to start a printing sequence. Since the printing head 30 makes exposure in the three-color frame sequential fashion in this embodiment, image data of the image displayed at that time on the LCD panel 25 is read out line by line sequentially from red image data, and is sent to the line memory 88. In this way, one line of image data is written in the line memory 88.

After confirming that the red-pass filter portion of the color filter 57 is inserted in the printing light path, and that the fluorescent display tube 47 does not emit light, the system controller 69 applies voltage to the filament 52. Thereafter when the system controller 69 confirms through a not-shown sensor that the printing head 30 is at the print start position, the red image data written in the line memory 88 is serially sent to the fluorescent display tube 47, so the respective anodes 57 emit light at intensities corresponding to the image data. The anodes 57 stop emission in a constant time.

More specifically, the anodes 57 of the first row 64 emit fluorescent light beams at intensities corresponding to densities of every second pixel of the first line of the red image. The fluorescent light beams are converted into red printing light beams through the red-pass filter portion of the color filter 43, and are projected onto the instant film sheet 21. Thereafter, the scanning motor 36 rotates through a predetermined angle to shift the printing head 30 by the pitch P corresponding to the interval between the first and second rows 64 and 65 of the anodes 57. Then, the anodes 57 of the second row 65 emit fluorescent light beams at intensities corresponding to densities of every other pixel of the first line of the red image.

Thereafter, the scanning motor 36 rotates to position the printing head 30 to a next line. Thereafter, red image data representative of densities of red pixels of the second line is transferred from the memory card 83 to the line memory 88. Red pixels of the second line is printed in the same way as for the first line. When printing of red pixels of one frame is completed, the system controller 69 sends the head driver 89 a filter change signal, to slide the color filter 43 in the direction Y by an amount to position the green-pass filter portion in the printing light path. The system controller 69 reads out green image data representative of green pixels from the memory card 83, line by line sequentially from the last line, and transfer it to the line memory 88.

Thereafter, the exposure to the green printing light is carried out in the reversed direction to the exposing direction for red, i.e. from the last line to the first line. After the completion of exposure to the green printing light, the blue-pass filter portion is inserted in the printing light path, and blue image data is read out from the memory card 83, line by line from the first line. Thus, blue pixels are printed in the same way as for the red pixels.

After the three color frames are sequentially recorded in this way, the system controller 69 starts driving the ejection motor 92 through the motor driver 91. Then, the exposed instant film sheet 21 is ejected out of the film pack 23 by the advancing claw mechanism 32, and then ejected by the film processing rollers 22 out of the camera body 2 through the film ejection slot 11. While the advancing claw mechanism 32 is inserted into the film pack 23 through the notch 23b to push the trailing edge of the exposed instant film sheet 21, the printing head 30 is displaced from the print end position in the film advancing direction, so the printing head 30 will not interfere with the advancing claw mechanism 32.

While the instant film sheet 21 is squeezed through the film processing roller 22, the pod 21a is ruptured, and processing fluid is spread over the film sheet 21. Thus, a positive image is developed on the instant film sheet 21 in a few minutes after the ejection.

The printing sequence is automatically repeated a number of times in correspondence with the designated print number. Even if the remaining number of instant film sheets 21 is less than the desired number of hard copies, since the remaining number is displayed on the LCD panel 25, the operator can load a new film pack 23 as soon as the loaded film pack 23 is used up. So the time efficiency of printing is improved.

Although the above embodiment phonically alarms the user that the entered print number is greater than the remaining number of instant film sheets 21, it is possible to display an alarming indicia on the LCD panel 25 instead. It is alternatively possible to cancel an input signal from the multi-operation member 26 that represents the entered print number if the entered print number is greater than the remaining number of instant film sheets 21. When the input signal is canceled, the entered print number is not displayed on the LCD panel 25, so the user may notice that the entered print number is greater than the remaining number of instant film sheets 21.

Meanwhile, if the pack loading door 14 should be opened while the loaded film pack 23 contains some instant film sheets 21, an uppermost one of the remaining instant film sheets 21 could be fogged. Therefore, the system controller 69 may display an alarming indicia when it detects through the door position detector switch 18 that the pack loading door 14 is opened while there remain some instant film sheets 21 in the loaded film pack 23.

According to another embodiment, the pack loading door 14 is not unlocked from the door lock mechanism 19 even when the unlocking button 8 is pressed, if there remain some instant film sheets 21 in the loaded film pack 23. In this embodiment, because the film pack 23 sometimes needs to be unloaded before it is emptied, for instance when the instant film sheets 21 are out of available due date, it is necessary to provide a device for forcibly unlocking the pack loading door 14. For example, the pack loading door 14 may be unlocked by pressing the unlock button 8 over a predetermined time period, or by pressing another button concurrently with the unlock button 8, even if the loaded film pack 23 still contains some instant film sheets 21.

The printing head 30 may have another configuration. For example, micro light emitting diodes (LED) of red, green and blue may be used as a light source. In that case, the color filter 43 is not necessary. Density of each pixel may be adjusted by controlling light intensity of the micro LEDs. The micro LEDs of one color are aligned in a line, and are driven sequentially from one color to another for recording a full-color image in the color frame sequential fashion. Alternatively, the three color micro LEDs are driven concurrently to project the printing light of three colors onto the instant film sheet 21. Then, a full-color image is recorded while the printing head 30 moves once in the sub scan direction relative to the instant film sheet 21.

Although the present invention has been described with respect to the embodiments where the film pack is loaded in the printer-incorporated camera, the present invention is applicable to those types where the instant film sheets are directly loaded. The present invention is also applicable to those printer-incorporated cameras whose printer section is of thermosensitive type, thermal transfer type, laser scanning type or the like.

Thus, the present invention is not to be limited to the above embodiments but, on the contrary, various modifications will be possible to those skilled in the art without departing from the scope of claims appended hereto.

What is claimed is:

1. A printer-incorporated electronic still camera comprising:
    an imaging device for obtaining image signals from subjects, and storing digital image data obtained from the image signal as still images in a memory;
    a chamber for loading a stack of recording sheets;
    a printing device for printing images successively on the recording sheets on the basis of the image data read out from the memory;
    a print number input device for entering the print number of hard copies of a still image;
    a counting device for counting the number of recording sheets remaining unused in the chamber;
    a comparing device for comparing the entered print number with the remaining number of recording sheets; and
    an alarming device for alarming when the entered print number is greater than the remaining number of recording sheets.

2. A printer-incorporated electronic still camera as claimed in claim 1, further comprising a device for stopping the printing device from printing when the entered print number is greater than the remaining number of the recording sheets.

3. A printer-incorporated electronic still camera as claimed in claim 1 or 2, wherein the entered print number is canceled when the entered print number is greater than the remaining number of the recording sheets.

4. A printer-incorporated electronic still camera as claimed in claim 1, wherein the recording sheets are self-development type instant film sheets, and a film pack containing a predetermined number of instant film sheets is loaded in the chamber in a light-tight fashion.

5. A printer-incorporated electronic still camera as claimed in claim 4, wherein the counting device is interconnected with a pair of spread rollers through which the instant film sheet after exposure is ejected out of the camera.

6. A printer-incorporated electronic still camera comprising:
    an imaging device for obtaining image signals from subjects, and storing digital image data obtained from the image signal as still images in a memory;
    a chamber for loading a stack of recording sheets;
    a printing device for printing still images successively on the recording sheets on the basis of the image data read out from the memory;
    a print number input device for entering the print number of hard copies of a still image;
    a counting device for counting the number of recording sheets remaining unused in the chamber;
    a comparing device for comparing the entered print number with the remaining number of recording sheets; and
    a device for stopping the printing device from printing when the entered number is greater than the remaining number.

7. A printer-incorporated electronic still camera comprising:
    an imaging device for obtaining image signals from subjects, and storing digital image data obtained from the image signal as still images in a memory;

a chamber for loading a stack of recording sheets;

a printing device for printing still images successively on the recording sheets on the basis of the image data read out from the memory;

a counting device for counting the number of recording sheets remaining unused in the chamber;

a comparing device for comparing the entered print number with the remaining number of recording sheets; and a device for canceling the entered print number when the entered print number is greater than the remaining number of the recording sheets.

8. A printer-incorporated electronic still camera comprising:

an imaging device for obtaining image signals from subjects, and storing digital image data of the subjects obtained from the image signal as still images in a memory;

a chamber for loading a stack of photosensitive recording sheets;

a door member for closing the chamber in a light-tight fashion;

a printing device for printing still images successively on photosensitive recording sheets on the basis of the image data read out from the memory;

a counting device for counting the number of photosensitive recording sheets remaining unused in the chamber;

a device for detecting that the door member is opened; and an alarming device for alarming when the door member is opened while there are any unused photosensitive recording sheets in the chamber.

9. A printer-incorporated electronic still camera as claimed in claim 8, wherein the photosensitive recording sheets are self-development type instant film sheets, and a film pack containing a predetermined number of instant film sheets is loaded in the chamber.

10. A printer-incorporated electronic still camera as claimed in claim 9, wherein the counting device is interconnected with a pair of spread rollers through which the instant film sheet after exposure is ejected out of the camera.

11. A printer-incorporated electronic still camera comprising:

an imaging device for obtaining image signals from subjects, and storing digital image data of the subjects obtained from the image signal as still images in a memory;

a chamber for loading a stack of photosensitive recording sheets;

a door member for closing the chamber in a light-tight fashion;

a printing device for printing still images successively on photosensitive recording sheets on the basis of the image data read out from the memory;

a counting device for counting the number of photosensitive recording sheets remaining unused in the chamber;

a device for detecting that the door member is opened; and a locking device for locking the door member in its closed position so long as there are any unused photosensitive recording sheets in the chamber.

12. A printer-incorporated electronic still camera as claimed in claim 11, wherein the photosensitive recording sheets are self-development type instant film sheets, and a film pack containing a predetermined number of instant film sheets is loaded in the chamber.

13. A printer-incorporated electronic still camera as claimed in claim 12, wherein the counting device is interconnected with a pair of spread rollers through which the instant film sheet after exposure is ejected out of the camera.

* * * * *